United States Patent [19]

de Monts et al.

[11] 4,255,024
[45] Mar. 10, 1981

[54] SPECTACLES FRAME OF WOOD

[76] Inventors: Thibaut de Monts, 7, rue Maitre Albert, Paris, France, 75005; Herve de Varax, Malieu, La Tour Du Pin, France, 38110; Jacques Gourvenec, 5 rue de Charonne, Paris, France, 75011

[21] Appl. No.: 972,937

[22] Filed: Dec. 26, 1978

[30] Foreign Application Priority Data

Jan. 3, 1978 [FR] France ............................... 78 00032

[51] Int. Cl.³ .............................................. G02C 5/00
[52] U.S. Cl. ....................................... 351/41; 351/95
[58] Field of Search ................... 351/41, 95; 2/13, 14; 391/19; 206/5, 6; 350/133; 40/1; 144/281, 309, 324; 156/79; 147/41, 59, 57; 33/110–114; D16/65

[56] References Cited

U.S. PATENT DOCUMENTS

| 982,720 | 1/1911 | Hiscock | 144/309 R |
| 1,133,106 | 3/1915 | Cuppett | 144/309 R |
| 2,985,556 | 5/1961 | Rowland | 351/41 |
| 3,597,053 | 8/1971 | Mastman | 351/41 |
| 4,006,974 | 2/1977 | Resnick | 351/41 |

FOREIGN PATENT DOCUMENTS 7505132 8/1976 Fed. Rep. of Germany .
372699 5/1932 United Kingdom ..................... 351/41

Primary Examiner—John K. Corbin
Assistant Examiner—B. Wm. de los Reyes
Attorney, Agent, or Firm—Bacon & Thomas

[57] ABSTRACT

The main components of the frame are constituted by slats of wood arranged in layers, shaped and adhesively assembled.

13 Claims, 21 Drawing Figures

SPECTACLES FRAME OF WOOD

The present invention relates to spectacles frames made of wood.

Spectacle frames are called upon to combine a number of qualities which are difficult to harmonize, such as for example: lightness and robustness, rigidity of the frame and flexibility of the branches. In addition they should be adapted to the personality of the user and be ever more refined in their design to follow the current trends of fashion.

At the moment these technical and design requirements limit the spectacles industry to a restricted number of raw materials which are mainly synthetic materials, metal and tortoise-shell.

It would be possible, with wood, to obtain some really new and attractive aesthetic characteristics, because of the different varieties which could be used.

Certainly it could be considered to produce the spectacles frames by cutting in close-grained wood. But, unfortunately the complexity of the general design of the frames leads to a great fragility of certain parts which will, necessarily, be worked against the grain, thereby eliminating, for practical reasons, the use of this material.

The object of the invention is to overcome this disadvantage in order to obtain spectacle frames in wood, and combining solidity with a particularly attractive design.

This object is reached according to the invention is that the main elements composing the frame are constituted by slats of wood placed in layers, shaped, and adhesively assembled together.

The use of adhesively joined slats of wood makes it possible to combine the natural beauty of the wood with the technical characteristics required for spectacles frames.

It may be considered to form the frame form a plurality of slats of wood adhesively joined together and arranged so that their surface is substantially parallel to the surface of the support frame, provided that at least two slats are arranged so that the grain of their wood is in two different directions, preferably in two directions perpendicular to each other.

But in a preferred embodiment of the invention, the support frame is formed of fine slats of wood adhesively joined together and arranged so that their surface is substantially perpendicular to the general plane of the lenses and of the frame assembly. In this way, the rigidity of the closed frame is combined with the possibility of setting the lenses in the rims and dismantling them, by resilient deformation of the said rims when the frame is open.

In the same way, each branch will be constituted of slats of uniform thickness assembled so that their surface is substantially parallel to the general plane of the glasses and of the frame assembly, when the branches are in the folded position. The branches may thus be deformed to be adapted to the head of the user. Preferably, the structure of the slats will be such that, for at least one of them, for example the slat which is on the surface of the frame and which is visible, the grain is in a direction which corresponds to the largest dimension of the slat.

The slats may be given different dimensions and their assembling method may be selected so as to obtain variations of the cross-section on a selected part of the support frame or of the branches, thereby improving the mechanical properties of that part, and the end of each slat may also be bevelled in the width and in the thickness.

According to a particular embodiment of the support frame, it is possible to insert between its constituting slats solid pieces of wood or of any other material, in order to constitute the bridge, the supports means for receiving the hinges or any other mechanical or ornemental members.

According to another particular embodiment, the frame may be fashioned by assembling the sub-assemblies such as, for example, the branches, the support-frame or else the part constituted by the bridge and the two eye rims, so that at least one of the sub-assemblies which constitute the frame forms a part of continuous outline, that-is-to-say that the slat structure runs without discontinuity all around the said sub-assembly, including for example, at least two of the elements constituting the bridge, the rims, the front bar, the wings supporting the hinges of the branch, etc. This assembling method can offer a large variety of lines, whether opened, closed or ramified and it affords the possibility of creating new designs.

According to another particular embodiment of the frame according to the invention, a metal insert may be positioned between the wood slats with a view to reinforcing the particularly fragile areas and to serve as an assembling element between the different parts of the frame.

The metal inserts are fitted in when the slats are glued together. The insert housing may be obtained by notches provided for this purpose in one or more slats, or by squeezing the slat structure when said latter is being pressed. In any case, the insert is held captive between the external slats.

A metal strip inserted thus along the branches during the manufacture, between the plies of the wood and lengthwise, facilitates the adaptation of the branch to the head of the user, by manual deformation. It is thereafter possible, because of the rigidity of the metal strip, to retain the desired curvature.

Another special feature of the frame according to the invention is that the adhesive used for assembling the slats constituting the branches will be of the so-called "flexible film" type which allows a slight relative longitudinal movement of the layers with respect to one another, without any risk of breaking or loosening of the slats when shaping the branches. On the contrary, the adhesive used for assembling the slats of the support frame may be of the rigid type in order to confer to the said carrier frame enough rigidity and strength when it is closed to ensure that the glasses are held in the correct position without eliminating the resiliency which permits the opening of the said frame for fitting in the glasses.

The adhesives used in the preparation of the support frame, of the branches or of the sub-assemblies which compose them, should be able to withstand any kind of atmospheric conditions such as temperature and damp; they should be chemically neutral, non-irritant and compatible with the wood varieties used.

By way of example, the thixotropic glues of the neoprene or vinylic type can be used for making the branches, and of the epoxide type for making the rigid elements of the support frame.

The varieties of wood constituting the slats used for making the frames are selected for their ability to bend easily, for the quality of their fibre, for their low nodosity, for the absence of any oils or acidity which would be incompatible with the adhesives used and of course, as far as the external slats are concerned, for their appearance.

In order to protect the wood against the outside elements and against staining from secretions of the skin, the different parts making up the frame, may be protected, after the machining and polishing operations, by a coating of varnish, which may be colorless and with a dull finish so as to retain the natural look of the wood.

Detailed examples are described hereinafter, by way of information and non-restrictively, reference being made to the accompanying drawings wherein:

FIGS. 1a, 1b, 1c illustrate three phases of the fashioning of a support frame for a spectacles frame according to the invention, FIG. 2 is a perspective view of the support frame thus obtained.

FIGS. 3a and 3b respectively show an exploded view and a cross-sectional view of a detail of the stacking and mounting of a slat assembly in an area of the support frame shown in FIG. 2, FIGS. 4a and 4b respectively show a perspective and a cross-sectional view of one detail of the area in the support frame which carries the hinge supports of the branches, FIG. 5 is a detailed view of a variant embodiment of a bridge in a support frame according to the invention, FIG. 6 is a perspective view of another variant embodiment of a support frame according to the invention with closed outlines, a ramified bridge and incorporated solid pieces of wood, FIG. 7 is a schematic view of the support frame shown in FIG. 6, giving a diagrammatical representation of the slat assembling method, FIG. 8 is a perspective view of another variant embodiment of a frame according to the invention, consisting of a plurality of sub-assemblies, FIG. 9 is a detailed view of stacked slats with a metal insert, constituting the branch of a frame according to the invention, FIG. 10 is a perspective view of a variant embodiment of a branch comprising two-sub-assemblies of adhesively joined slats, a metal insert and solid wood elements, FIGS. 11 and 12 are two perspective views of respectively the metal insert and a solid wood element, contained in the branch shown in FIG. 10, FIG. 13 is a perspective view of yet another embodiment of a frame assembled in accordance with the invention, and FIGS. 14 to 17 are detailed views of variant embodiments of frames according to the invention.

FIGS. 1a to 1c illustrate the fashioning of a support frame for a spectacles frame according to the invention.

FIG. 1a shows some slats of wood which are precut and pre-coated with adhesive, and of which the grain is seen to be lengthwise thereof. These slats are stacked at the front of a shaping mold comprising two blocks 2 of predetermined cross-section. Metal inserts 3, on which will be fitted the hinges joining the branches to the frame, are introduced between the outer slats into notches 4 provided in the inner slats of the stack. The said inserts are fitted in as shown by arrows F1.

Figure 2:
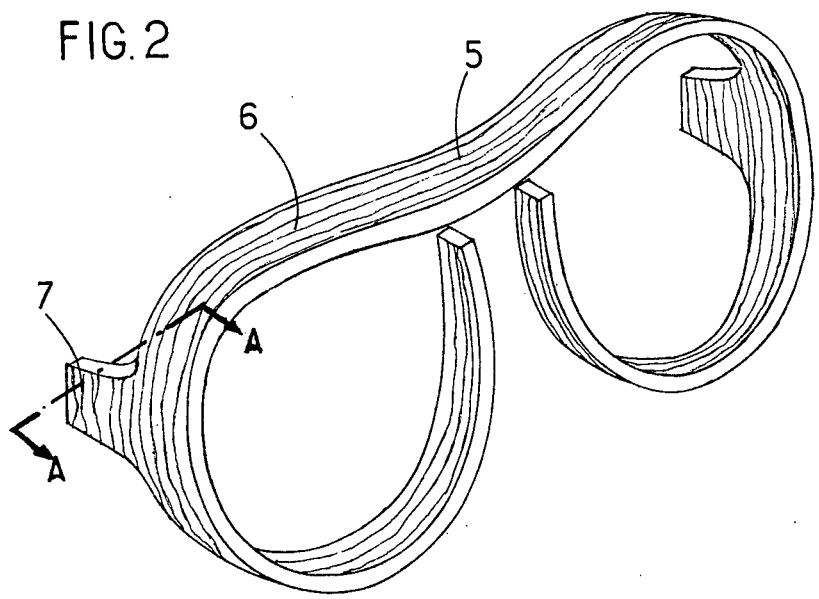

FIG. 2 shows an example of support frame which may be produced according to the preceding method. The front part 5 is reinforced by increased thickness, due to the use of a greater number of slats than that used for the upper ends 6 of the eye rims. A wing 7, forming an integral part with the slat structure of the support frame will be a support for each of the hinges of the branches.

Figure 3A:
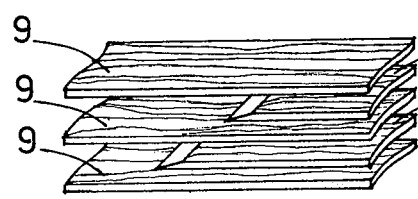

FIG. 3a shows an exploded view of one detail of the slats which constitute the central area 5 of the front bar of the support frame shown in FIG. 2. Extra slats are inserted between the slats 9 forming the whole outline of the frame, so as to increase locally the thickness of the latter. The slats 8 are bevelled at their ends.

Figure 3B:

FIG. 3b shows the same slats 8, 9 but adhesively assembled together.

Figure 4B:
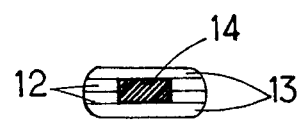
Figure 4A:
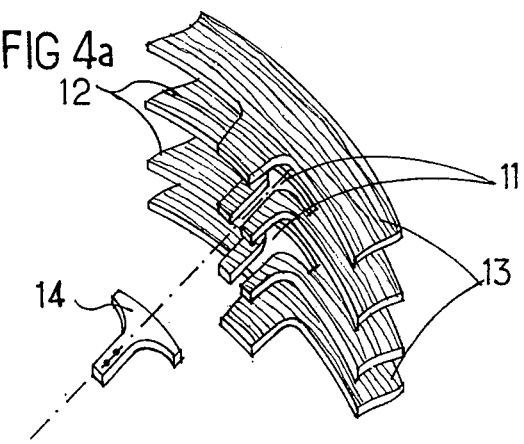

FIGS. 4a and 4b show details of the elements constituting the lug 7 of the support frame shown in FIG. 2. FIG. 4a gives an exploded view of the notches 11 provided in the slats 12 of the support frame, the slats 13 presenting no notches. A metal insert 14 is introduced between the plies 13 and positioned in the notches 11. The FIG. 4b is a cross-sectional view along the line AA of FIG. 2. It is possible on said FIG. 4b to see the slats 12 and 13 of the support frame and of the metal insert 14.

Figure 1A:
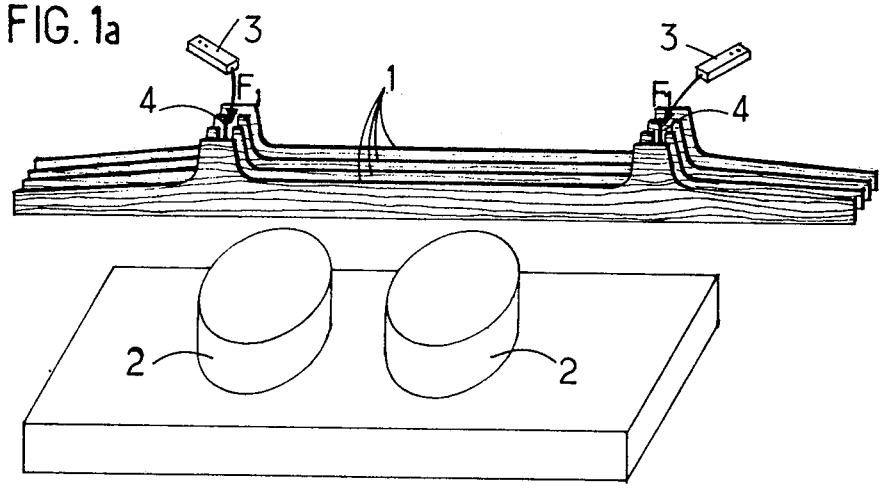
FIG. 1b shows the fashioning by winding the slats 1 around the template 2 in the direction of arrow F2, a pressure being exerted in the directions shown by arrows P.
FIG. 1c shows, after the completed fashioning, the stacked slats which constitute the support frame, held under pressure along arrow P until the adhesive has set hard.
Figure 1B:
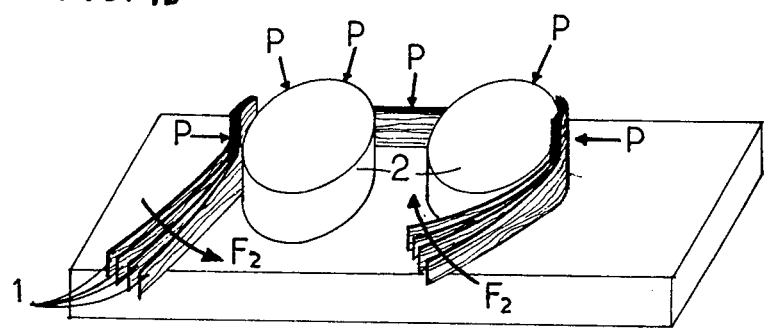
Figure 1C:
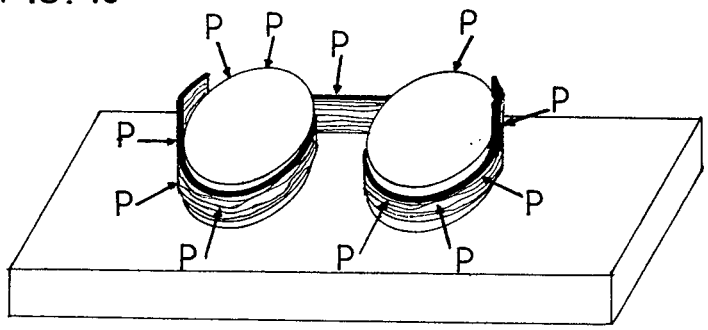
Figure 5:
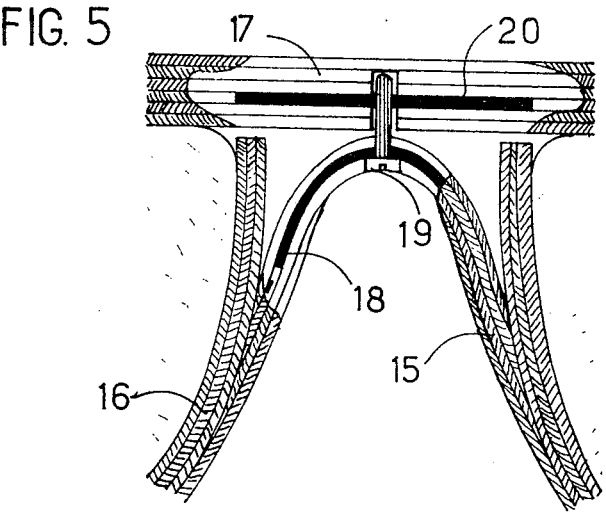

FIG. 5 shows explicitly the embodiment of a bridge and of the closure of the eye rims according to a possible variant of production according to the method illustrated in FIGS. 1a and 1c.

The bridge 15 may be produced separately and then assembled to the eye rims 16 by inserting it between the slats constituting the rims and which are open at their inner end in the vicinity of the central bar 17 of the frame.

The bridge 15 may be mechanically reinforced by insertion, between its constituting slats, of a metal strip 18, and this when the bridge is being produced. The tight clamping of the glasses is effected after their introduction into the bezels milled to this effect inside the eye rims, by pressing the bridge 15 against the front bar 17. This clamping is effected by means of a simple screw 19 introduced in a countersunk hole provided in the centre of the bridge. The screw 19 may be screwed in a metal insert 20 embedded between the slats of the center part of the front bar of the support frame.

Figure 6:
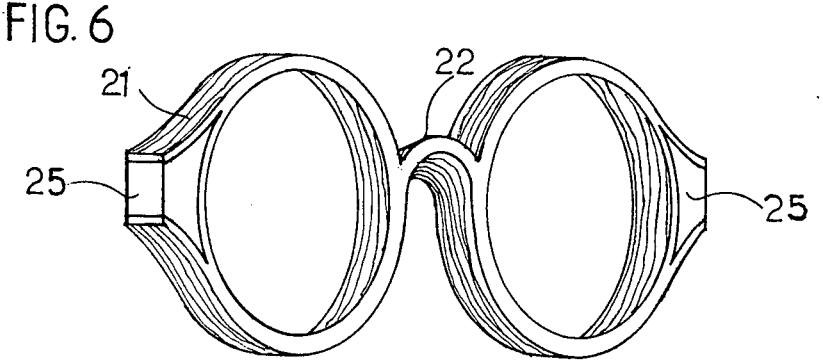

FIG. 6 shows another embodiment of a support frame according to the invention.

The support frame is constituted by a sub-assembly comprising two eye rims 21 joined together by a bridge 22 and assembled by ramification of the slats of the bridge and of the slats constituting the ocular rims. Two pieces of solid wood 23, used as a base for the hinges of the branches, are inserted between the outer ends of the eye rim 21.

Figure 7:
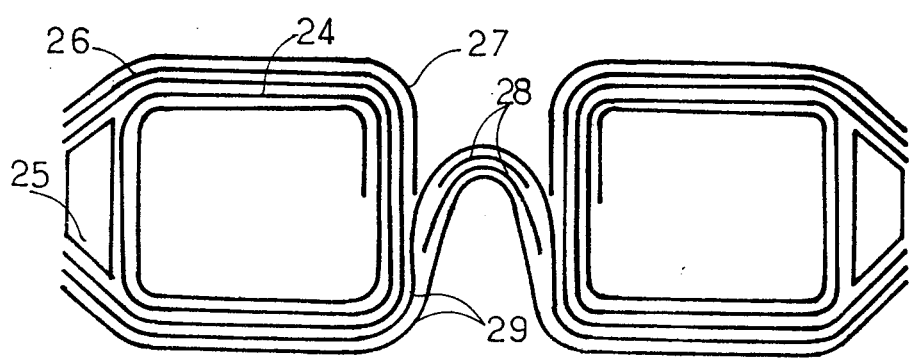

FIG. 7 diagrammatically shows one example of disposition and fashioning of the slats constituting the support frame illustrated in FIG. 6. One slat 24 is seen, which is coiled to form an eye rim. The solid piece of wood 25, which is used as a hinge base, is held against the eye rim by means of plies 26. The slat 27 serves as a reinforcement for the upper part of the eye rim. The bridge is composed of slats 28 and is joined to the eye rims by the slats 29; it can be reinforced by inserting a strip of metal. The slats 28 are assembled, according to tangential surfaces, to planes which are inclined with respect to the general plane of the support frame, so that the bridge 22, which is thus obtained, follows the outline of the nose.

Figure 8:
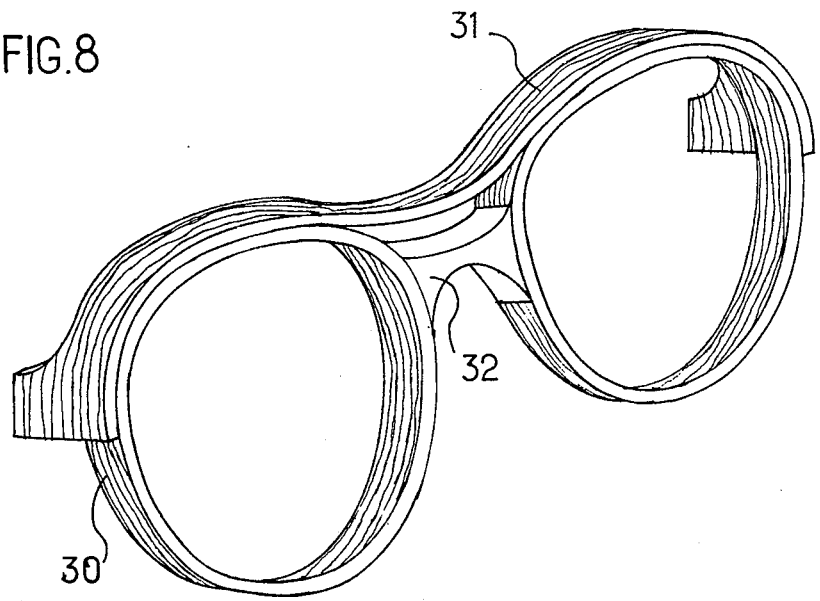

FIG. 8 shows another embodiment of a support frame according to the invention. This one is different from the preceding ones in that it consists of an assembly obtained by adhesive means or by any other assembly means, of individually produced sub-assemblies.

At least one of the sub-assemblies is made of adhesively joined slats, at least one other being made of solid wood.

FIG. 8 shows the eye rims 30 produced by assembly of wood slats. The front part 31 is provided at each end, with wings which will serve as bases for the hinges of the branches produced in the same way. The bridge 32 may be produced by machining a piece of solid wood or a block of adhesively joined slats of wood.

In the case of the spectacles frames illustrated in FIGS. 6 and 8, one or more solid pieces of wood are assembled to the slats. As a variant, said solid pieces may be made of metal or of a synthetic material.

Figure 9:
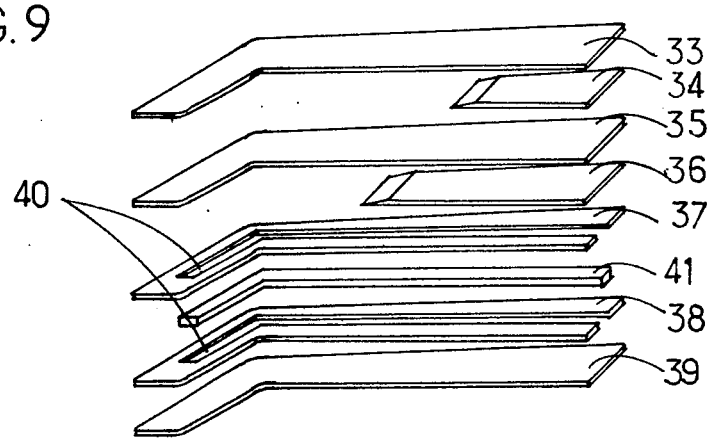

FIG. 9 is an exploded view showing an example of production of the branches. The slats 33 to 39 which are pre-cut by stamping or any other cutting method, are stacked in relation to the thickness of the branch. The centre slats 37 and 38 are provided with a notch 40 for housing a metal insert 41 used as reinforcement and allowing the branch to retain, after deformation, the desired curvature.

Slats 34 and 36, of different length and bevelled at their end, are inserted between the slats 33, 35 and 37 to give the branch a variable cross-section.

Figure 10:
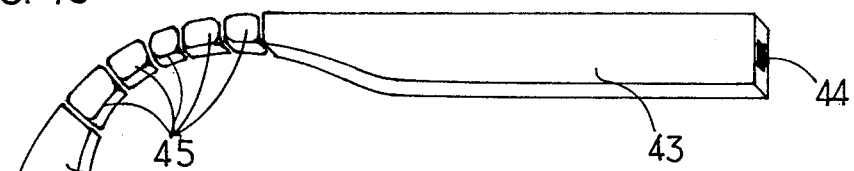
Figure 11:
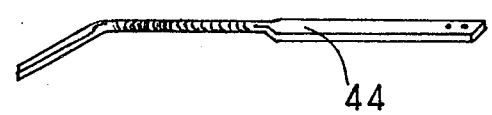
Figure 12:

FIG. 10 shows another embodiment of the branches which comprises two sub-assemblies 42 and 43 made of adhesively joined slats of wood, a metal insert 44 and wood elements 45. FIG. 11 shows the metal insert of rectangular cross-section which extends in tapered form in its auricular part on which are set small wooden elements 45 drilled along their axis as shown in FIG. 12. With this assembly it is possible to change the auricular curvature of the branch, at will, by manual deformation. As a variant, each branch of the frame can comprise an armature of metal or of synthetic material, extending over the whole or only part of the thickness of the branch and covered on its faces with wood slats to which said armature is adhesively assembled.

Figure 13:
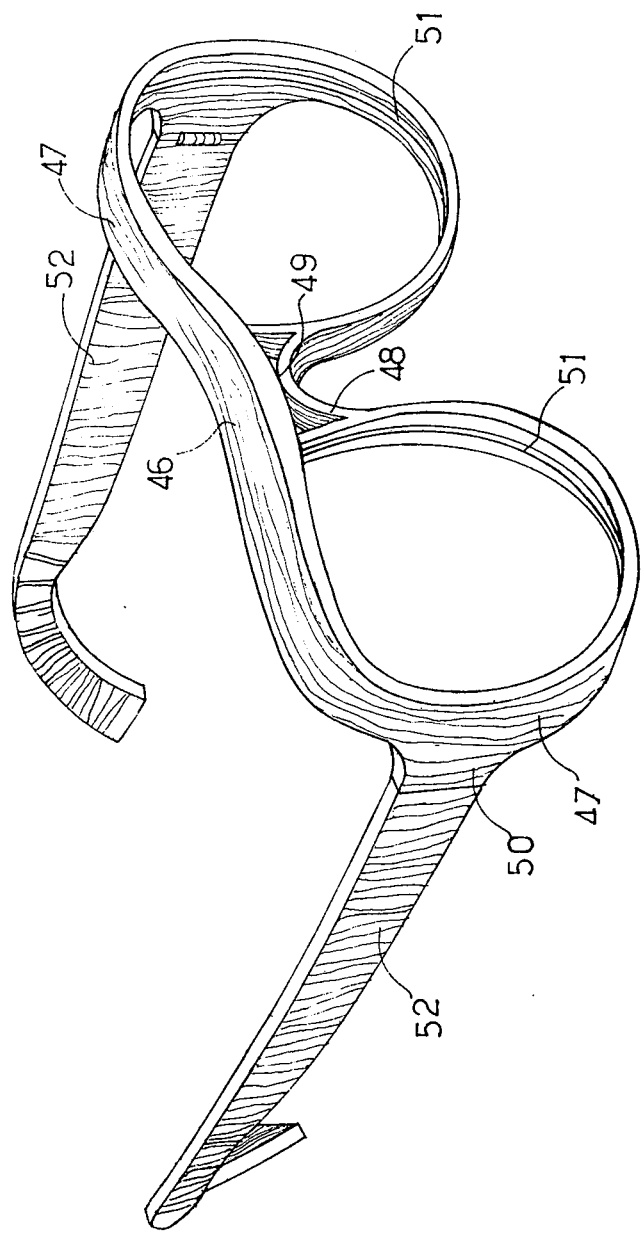

FIG. 13 shows a perspective of another embodiment of a spectacles frame according to the invention, wherein a frontal bar 46 forms a single unit with the eye rims 47, the bridge 48 and the wings 50 supporting the hinges. Bezels 51 are provided in the eye rims in order to receive the lenses. The branches 52 are pivotally mounted on hinges secured to the wings 50.

The lenses are set in the bezels 51 by tightening a screw joining in 49 the bridge 48 to the front bar 46, in a similar way as described hereinabove with reference to FIG. 5. Such a setting method is well known per se.

It will be noted that the non-closed eye rims 47 show a relative elasticity which contributes to the accurate setting of the lenses.

Figure 14:
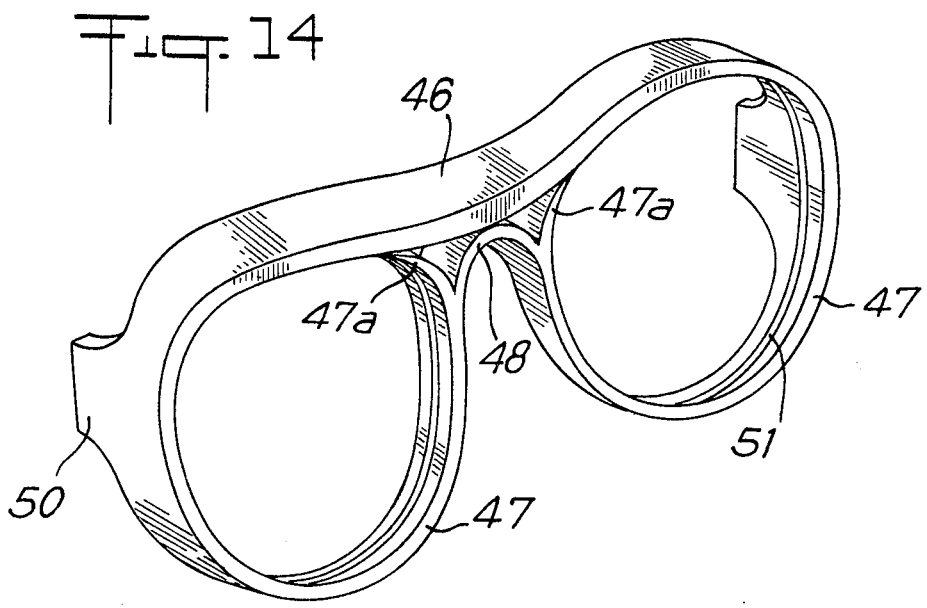

The ends 47a of the eye rims 47 joining up the front bar in its centre part may be bevelled and extended towards the sides under the front bar as illustrated in FIG. 14. The glass is then completely encircled with no sharp angles. The bevelled ends 47a can progressively join the inner face of the front bar resting thereon (FIG. 14) or, as a variant, it can be housed in recesses provided in the said inner face. In either case, a continuous outline of the eye rims is advantageously retained.

The lenses may be set in the eye rims by any other method than those described hereinabove.

Figure 15:
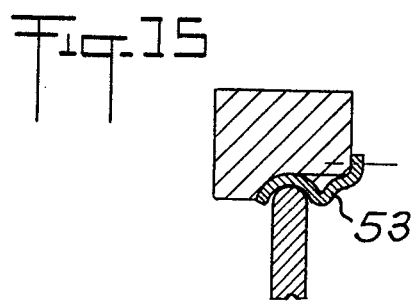

For example, each eye rim may be provided with a metal bezel such as that 53 shown in cross-section in FIG. 15.

Figure 16:
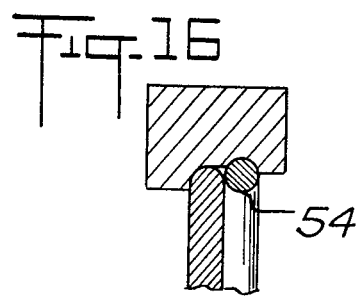

As a variant, a lense may be set in an eye rim in the way known per se, by means of a ring 54 fitted in a groove 55 of the eye rim (FIG. 16). This can be used in particular in the case of closed rims such as those illustrated in FIGS. 6 and 8.

Still as a variant, the eye rims can be open on their outer side edges and provided, at that level, with a system for tightening them. Then, advantageously, the front bar may be extended laterally to cover up the tightening system.

The means for pivotally connecting the branches to the support frame are hinges which are secured to the wings such as 50 (FIG. 13) or to solid pieces such as 25 (FIG. 14).

The hinges may be glued or riveted to a piece integral with the support frame. When such a piece is made of wood, to change the hinge becomes a very difficult if not impossible operation.

Figure 17:
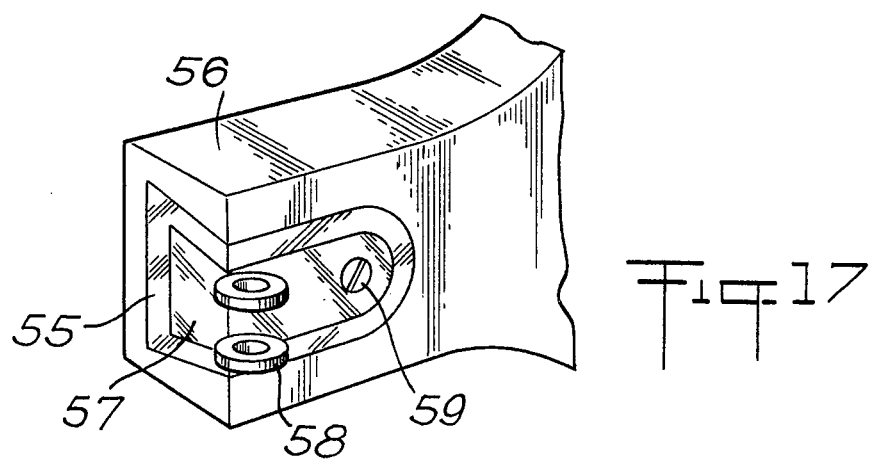

It is therefore preferred to have the hinge 58 mounted on a part 57 which is assembled by means of a tenon and mortise, such as a dovetailed tenon, to a rigid base 55, a metal base for example, integral with a wing 56 of the frame (FIG. 17). The connection between the said wing of the frame and the base may be an adhesive connection or else a tenon and mortise type assembly in a housing provided on the inner side of the said wing. The part 57 is secured in position by means of a screw 59.

Various modifications or additions may be made to the embodiments hereinabove described of a spectacles frame according to the invention without for all that departing from the scope of protection defined by the accompanying claims.

In particular, the branches of the frame may be provided with slide or screw systems, which are known per se, and which permit to adjust their length.

What is claimed is:

1. A spectacles frame comprising:
 a plurality of elongated thin resilient wood slats arranged in superposed relation and adhesively secured together to define a laminated support frame shaped to define spaced lens loops lying generally in a plane, the laminations of said support frame lying generally perpendicular to said plane; and
 there being at least one discontinuity in each of said loops whereby said loops may be resiliently expanded to receive lenses therein.

2. A spectacles frame as claimed in claim 1, further comprising branches hinged to said frame and each at least partially formed of resilient wood slats arranged in layers and adhesively assembled with their surface substantially parallel to said plane when in the folded position.

3. A spectacles frame as claimed in claim 1, wherein at least one slat of the support frame has its grain extending lengthwise of said slat.

4. A spectacles frame as claimed in claim 1, wherein the support frame is extended on each side by a wing which is integral with the slat structure of the support frame, said wings being usable for supporting hinged connection elements.

5. A spectacles frame as claimed in claim 1, wherein said support frame comprises slats having different lengths and positioned for producing a shape of variable cross-section.

6. A spectacles frame as claimed in claim 1, having branches essentially made of wood, wherein each branch comprises a metal insert having an end portion embedded in said support frame and a curved portion extending between the end portions of said branch, said curved portion corresponding to the auricular portion of the branch, having a tapered cross-section and being provided with at least one small wooden element surrounding the insert.

7. A spectacles frame as claimed in claim 1, wherein at least one wooden rigid piece is assembled to the slats of wood of said support frame.

8. A spectacles frame as claimed in claim 7, wherein said piece is a shaped bulky wood piece.

9. A spectacles frame as claimed in claim 7, wherein said piece is a shaped block of adhesively joined wood slats.

10. A spectacles frame as claimed in claim 7, wherein said wooden piece forms part of a bridge portion provided between the loops of the support frame.

11. A spectacles frame as claimed in claim 7, wherein said wooden piece forms part of a wing portion provided on one side of the support frame for supporting a connection element for a branch.

12. A spectacles frame as claimed in claim 1, wherein said support frame comprises a bridge portion formed by slats of wood inclined with respect to the plane of the support frame.

13. A spectacles frame as claimed in claim 1, wherein the inner face of each loop is formed by the same wood slat.

* * * * *